US012755676B2

(12) United States Patent
Tseng et al.

(10) Patent No.: US 12,755,676 B2
(45) Date of Patent: Oct. 6, 2026

(54) ELECTRONIC DEVICE HAVING TIME-INTERLEAVED CIRCUITS

(71) Applicant: InnoLux Corporation, Miao-Li County (TW)

(72) Inventors: Ming-Chun Tseng, Miao-Li County (TW); Lien-Hsiang Chen, Miao-Li County (TW); Yong-Zhi Liu, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 0 days.

(21) Appl. No.: 19/192,404

(22) Filed: Apr. 29, 2025

(65) Prior Publication Data

US 2025/0372029 A1 Dec. 4, 2025

Related U.S. Application Data

(60) Provisional application No. 63/653,238, filed on May 30, 2024.

(30) Foreign Application Priority Data

Nov. 7, 2024 (CN) ......................... 202411579966.5

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2310/061* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 10,455,653 | B1 | 10/2019 | Watanabe | |
| 10,867,553 | B2 | 12/2020 | Tseng | |
| 10,986,725 | B2 | 4/2021 | Chang | |
| 11,145,241 | B2 | 10/2021 | Chen | |
| 11,164,509 | B2 | 11/2021 | Chang | |
| 11,501,701 | B2 | 11/2022 | Ting | |
| 11,974,479 | B2 | 4/2024 | Hu | |
| 2017/0221419 | A1* | 8/2017 | Xiang | G09G 3/3233 |
| 2021/0183833 | A1 | 6/2021 | Hu | |
| 2021/0193790 | A1 | 6/2021 | Hu | |
| 2022/0328460 | A1* | 10/2022 | Fan | H01L 25/0753 |

FOREIGN PATENT DOCUMENTS

TW 202020850 A 6/2020

* cited by examiner

*Primary Examiner* — Joseph R Haley
(74) *Attorney, Agent, or Firm* — Winston Hsu

(57) ABSTRACT

An electronic device has a data line, a first scan line, a second scan line, a first electronic unit, a second electronic unit, a first circuit unit, and a second circuit unit. The first circuit unit is used to drive the first electronic unit and includes a first time-interleaved circuit. The second circuit unit is adjacent to the first circuit unit and is used to drive the second electronic unit, and includes a second time-interleaved circuit. The data line is coupled to the first circuit unit and the second circuit unit, the first scan line is coupled to the first time-interleaved circuit, and the second scan line is coupled to the second time-interleaved circuit.

19 Claims, 8 Drawing Sheets

ELECTRONIC DEVICE HAVING TIME-INTERLEAVED CIRCUITS

CROSS REFERENCE TO RELATED APPLICATION

This application claims the benefit of U.S. Provisional Application No. 63/653,238, filed on May 30, 2024. The content of the application is incorporated herein by reference.

BACKGROUND OF THE DISCLOSURE

1. Field of the Disclosure

The disclosure relates to an electronic device, and more particularly, to an electronic device comprising time-interleaved circuits.

2. Description of the Prior Art

As the spacing of electronic circuits becomes increasingly smaller and the circuits become more complex, more signal transmission lines are required internally. How to effectively utilize the limited layout space of electronic circuits has become a significant challenge in this field.

SUMMARY OF THE DISCLOSURE

According to some embodiments, the disclosure provides an electronic device comprising a data line, a first scan line, a second scan line, a first electronic unit, a second electronic unit, a first circuit unit, and a second circuit unit. The first circuit unit is used to drive the first electronic unit and includes a first time-interleaved circuit. The second circuit unit is adjacent to the first circuit unit and is used to drive the second electronic unit, and includes a second time-interleaved circuit. The data line is coupled to the first circuit unit and the second circuit unit, the first scan line is coupled to the first time-interleaved circuit, and the second scan line is coupled to the second time-interleaved circuit.

These and other objectives of the present disclosure will no doubt become obvious to those of ordinary skill in the art after reading the following detailed description of the embodiment that is illustrated in the various figures and drawings.

DETAILED DESCRIPTION

Figure 1:
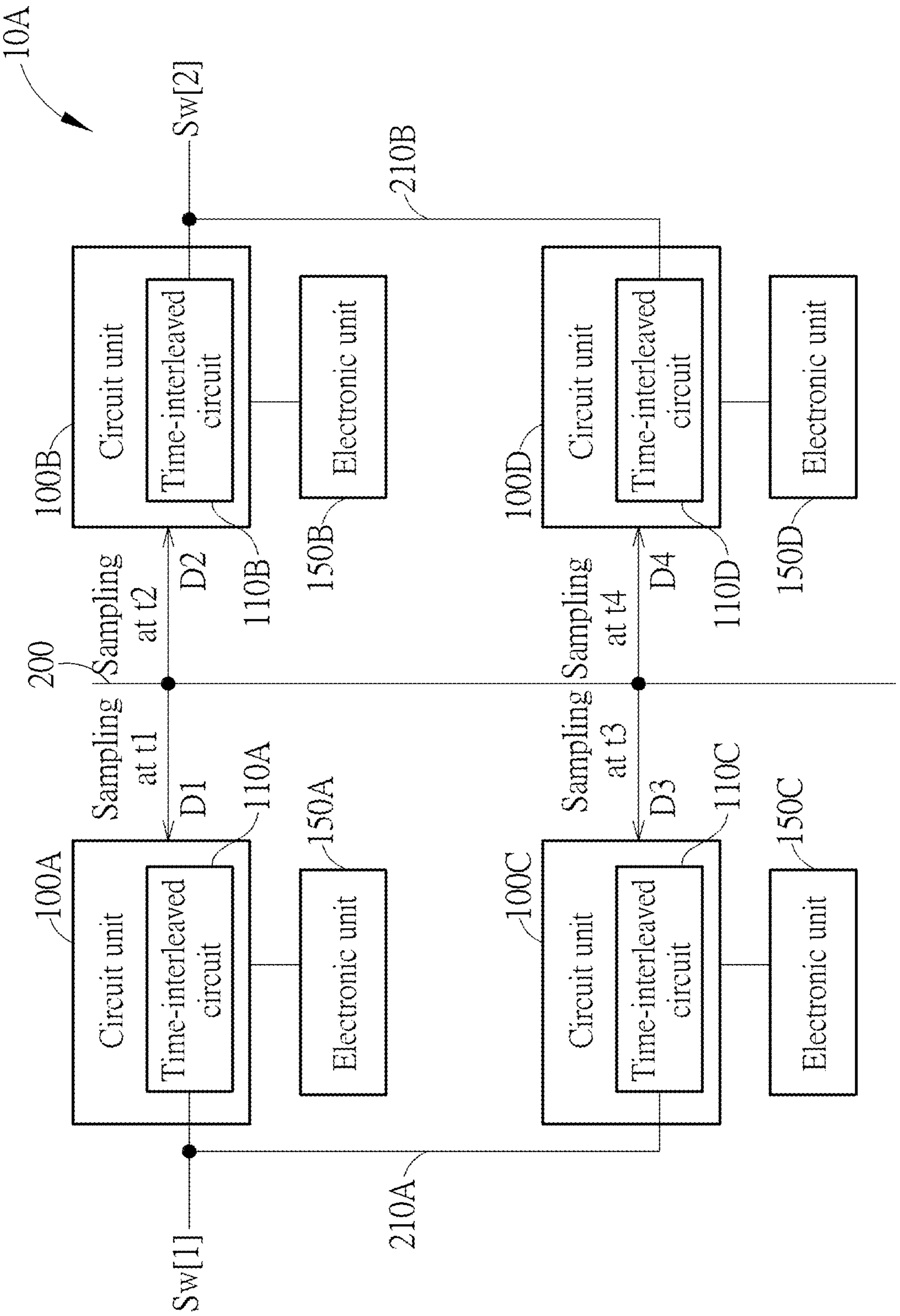
FIG. 1 is a functional block diagram of an electronic device according to one embodiment of the disclosure.

For a better understanding of the present disclosure, reference should be made to the following detailed description taken in conjunction with the accompanying drawings. It should be noted that for purposes of clarity and ease of understanding, the drawings may not be drawn to scale, and only a portion of the electronic device is shown in some of the figures. Moreover, the number and arrangement of elements in the figures are exemplary and not intended to be limiting.

As used throughout this specification and the appended claims, certain terms may be used to describe particular features. It will be understood by one of ordinary skill in the art that equivalent components may be referred to by different names in the industry. It is not the intent here to distinguish between those components that are functionally equivalent but that may be described by different names.

As used herein, the terms “including,” “comprising,” or “having” are to be construed as being open-ended terms and mean “including, but not limited to.” Accordingly, when the specification describes a device, method, process, or system as “comprising,” “including,” or “having” a list of elements, those elements are not to be construed as being exclusive or exhaustive of the elements, components, steps, or operations that can be included in such a device, method, process, or system.

The directional terminology used herein, such as “upper,” “lower,” “front,” “back,” “left,” and “right,” is intended to be relative for purposes of description and not as a limitation. The drawings illustrate generally the features of particular embodiments of the present disclosure. However, the drawings are not intended to define or limit the scope or nature of the disclosure. For example, for purposes of clarity, the relative sizes, thicknesses, and positions of various layers, regions, and/or structures may be exaggerated or minimized.

When a component (e.g., a layer or region) is referred to as being “on” another component, it may be directly on the other component, or there may be intervening components therebetween. On the other hand, when a component is referred to as being “directly on” another component, there are no intervening components therebetween. Additionally, when one component is referred to as being “on” another component, the two components have a vertical relationship, and the component may be above or below the other component, depending on the orientation of the device.

It should be understood that when a component or layer is referred to as being “connected to” another component or layer, it may be directly connected to the other component or layer, or there may be intervening components or layers therebetween. When a component is referred to as being “directly connected to” another component or layer, there are no intervening components or layers therebetween. Furthermore, when a component is referred to as being “coupled to” another component (or variations thereof), it may be electrically connected directly to the other component, or it may be indirectly connected (e.g., indirectly electrically connected) to the other component through one or more intervening components.

In the present disclosure, when a component is “disconnected” from another component, an electrical signal cannot flow between the two components at the specified time.

The terms “approximately” or “about” are generally interpreted as being within plus or minus 10% of a given value, or may be interpreted as being within plus or minus 5%, plus or minus 3%, plus or minus 2%, plus or minus 1%, or plus or minus 0.5% of a given value.

The use of ordinal terms such as “first,” “second,” etc., to modify an element in the specification and claims is intended solely for the purpose of distinguishing one element having that identifier from another element having the same identifier. The use of such ordinal terms does not imply any chronological order or manufacturing sequence. For example, a first element in the specification may be a second element in a claim.

It should be understood that the various embodiments may be combined to provide further embodiments. That is, the features presented in one embodiment may be included in or substituted for the features presented in other embodiments without departing from the scope of the disclosure.

In the present disclosure, the electronic device may include, but is not limited to, a display device, a light emitting device, an antenna device, a sensing device, a medical device, a splicing device, or any combination thereof. The display device may be a non-emissive display or an emissive display depending on the requirements, and may be a color display or a monochrome display depending on the requirements. The antenna device may be a liquid crystal antenna device or a non-liquid crystal antenna device. The sensing device may be a device for sensing capacitance, light, heat, or ultrasound. The medical device may be a medical testing device. The splicing device may be a display splicing device or an antenna splicing device, but is not limited thereto. The electronic device may include electronic components, which may include passive components and active components such as capacitors, resistors, inductors, diodes, transistors, dies, or chips. The diodes may be dies or chips and may include light emitting diodes (LEDs), photodiodes, or varactors, but are not limited thereto. The LEDS may include, but are not limited to, organic light emitting diodes (OLEDs), mini-LEDs, micro-LEDs, or quantum dot LEDs. The transistors may include, but are not limited to, top-gate thin-film transistors, bottom-gate thin-film transistors, or dual-gate thin-film transistors. The electronic device may also include, but is not limited to, fluorescent materials, phosphor materials, quantum dot (QD) materials, or other suitable materials. The electronic device may have peripheral systems such as a driving system, a control system, a light source system, and the like to support the devices and components in the electronic device.

It should be understood that the features of the various embodiments described herein may be substituted for, rearranged, or combined with each other to form other embodiments without departing from the spirit and scope of the present disclosure.

Referring to FIG. 1, FIG. 1 is a functional block diagram of an electronic device 10A according to one embodiment of the present disclosure. The electronic device 10A comprises a data line 200, a scan line 210A, a scan line 210B, an electronic unit 150A, an electronic unit 150B, a circuit unit 100A, and a circuit unit 100B. The circuit unit 100A is used to drive the electronic unit 150A and comprises a time-interleaved circuit 110A. The circuit unit 100B is arranged in proximity to the circuit unit 100A for driving the electronic unit 150B, and comprises a time-interleaved circuit 110B. The data line 200 is coupled to the circuit unit 100A and the circuit unit 100B, the scan line 210A is coupled to the time-interleaved circuit 110A, and the scan line 210B is coupled to the time-interleaved circuit 110B.

Figure 2:
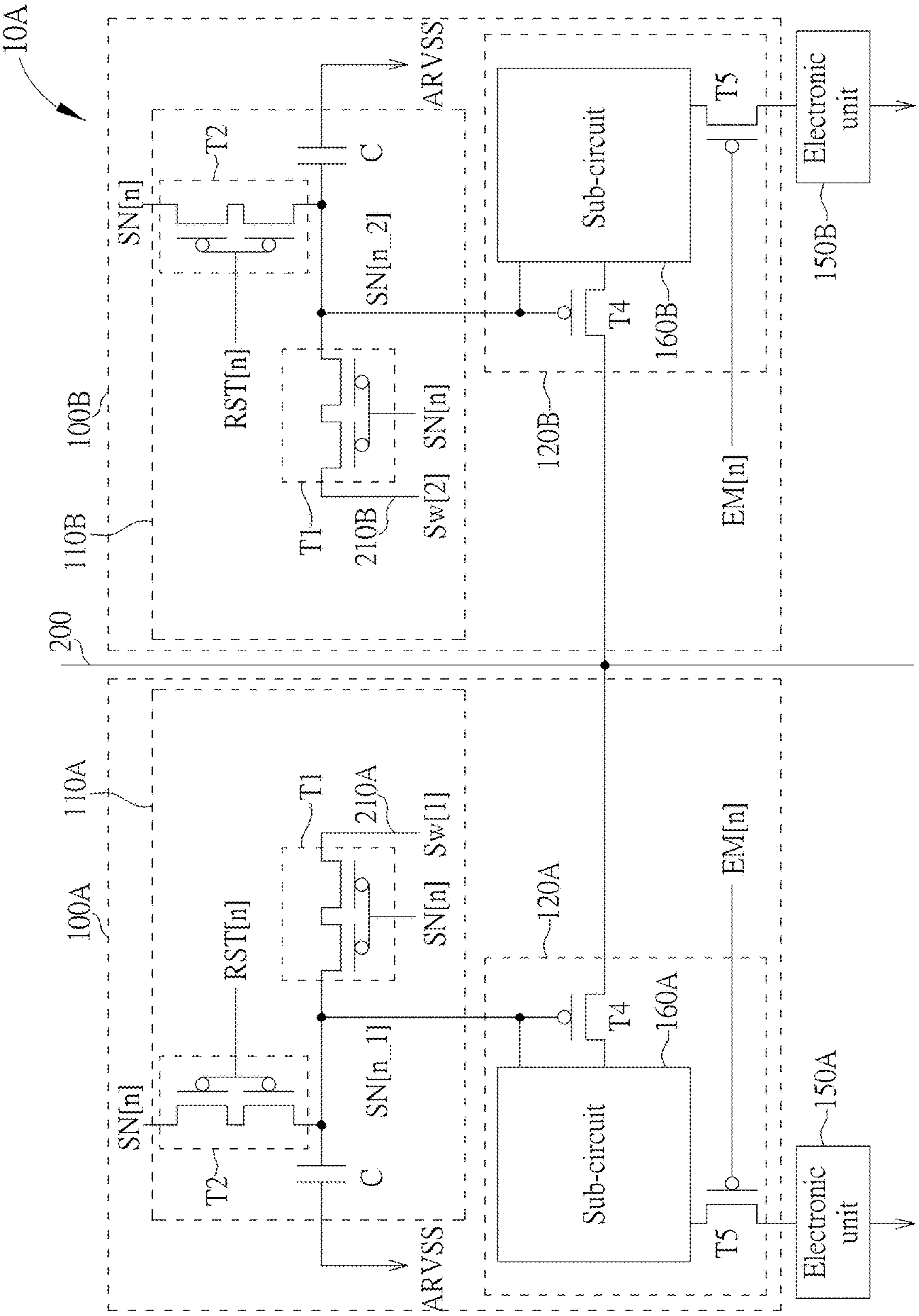
FIG. 2 is a partial circuit diagram of the electronic device in FIG. 1.

Referring to FIG. 2, FIG. 2 is a partial circuit diagram of the electronic device 10A 1 in FIG. 1. In addition to the time-interleaved circuit 110A, the circuit unit 100A further comprises a driving circuit 120A; and in addition to the time-interleaved circuit 110B, the circuit unit 100B further comprises a driving circuit 120B. At least one of the time-interleaved circuits 110A and 110B comprises a capacitor C. In the embodiment, each of the time-interleaved circuits 110A and 110B comprises a capacitor C. A first end of each capacitor C is coupled to at least two switches T1 and T2, and each switch T1 or T2 comprises at least one transistor, while a second end of each capacitor C is coupled to a system voltage terminal ARVSS. The voltage of the system voltage terminal ARVSS may be, but is not limited to, a ground voltage. In the embodiment, each of the switches T1 and T2 comprises two series-connected P-type transistors, but the present disclosure is not limited thereto. For example, each of the switches T1 and/or T2 may comprise only a single transistor, or the transistors of the switches T1 and/or T2 may be N-type transistors. In the embodiment, the control end (i.e., the gate of the two transistors) of the switch T1 of the time-interleaved circuit 110A receives a scan signal SN[n], a first end of the switch T1 of the time-interleaved circuit 110A is coupled to the scan line 210A to receive a clock signal Sw[1], and a second end of the switch T1 of the time-interleaved circuit 110A outputs a switching signal SN[n_1]. The control end (i.e., the gate of the two transistors) of the switch T2 of the time-interleaved circuit 110A receives a reset signal RST[n], a first end of the switch T2 of the time-interleaved circuit 110A receives a scan signal SN[n], and a second end of the switch T2 of the time-interleaved circuit 110A is coupled to the first end of the capacitor C and the second end of the switch T1 of the time-interleaved circuit 110A. The reset signal RST[n] is used to reset the voltage of the circuit units 100A and 100B. In the embodiment, the circuit structure of the time-interleaved circuit 110B is the same as that of the time-interleaved circuit 110A, except that a first end of the switch T1 of the time-interleaved circuit 110B is coupled to the scan line 210B to receive a clock signal Sw[2], and a second end of the switch T1 of the time-interleaved circuit 110B outputs a switching signal SN[n 2].

The driving circuit 120A comprises a switch T4, a switch T5, and a sub-circuit 160A. In the embodiment, both switches T4 and T5 are P-type transistors. The gate of switch T4 is coupled to the second end of switch T1 to receive a switching signal SN[n_1], the first end of switch T4 is coupled to the data line 200, and the second end of switch T4 is coupled to the sub-circuit 160A. The sub-circuit 160A may comprise a capacitor for storing data transmitted from the data line 200 when the switch T4 is turned on. The gate of switch T5 receives an enable signal EM[n], the first end of switch T5 is coupled to the sub-circuit 160A, and the second end of switch T5 is coupled to the electronic unit 150A. When the switching signal SN[n_1] is low, the switch T4 is turned on; when the switching signal SN[n_1] is high, the switch T4 is turned off. The enable signal EM[n] is used to enable the electronic units 150A and 150B. When the enable signal EM[n] is low, the switch T5 is turned on; when the enable signal EM[n] is high, the switch T5 is turned off. When the switch T5 is turned on, the data stored in the capacitor of the sub-circuit 160A can be transmitted to the electronic unit 150A, allowing the electronic unit 150A to operate based on the received data. The electronic unit 150A can be a light-emitting unit, a sensor, an antenna, or a radio frequency (RF) component. For example, if the electronic unit 150A is a light-emitting unit, when the switch T5 of the driving circuit 120A is turned on, the driving circuit 120A can drive the electronic unit 150A to emit light based on the data stored in the sub-circuit 160A. If the electronic unit 150A is a sensing unit, when the switch T5 of the driving circuit 120A is turned on, the driving circuit 120A can drive the electronic unit 150A to perform sensing operations based on the data stored in the sub-circuit 160A. Furthermore, if the electronic unit 150A is an RF component, when the switch T5 of the driving circuit 120A is turned on, the driving circuit 120A can drive the electronic unit 150A to transmit a radio signal based on the data stored in the sub-circuit 160A. The circuit structure of the driving circuit 120B is similar to that of the driving circuit 120A, and the driving circuit 120B comprises a switch T4, a switch T5, and a sub-circuit 160B. The difference between the two driving circuits 120A and 120B is that the gate of the switch T4 of the driving circuit 120B receives a switching signal SN[n 2], the second end of the switch T4 of the driving circuit 120B and the first end of the switch T5 of the driving circuit 120B are coupled to the sub-circuit 160B, and the second end of the switch T5 of the driving circuit 120B is coupled to the electronic unit 150B. In the embodiment, both switches T4 and T5 of the driving circuit 120B are P-type transistors. When the switching signal SN[n 2] is low, the switch T4 of the driving circuit 120B is turned on; when the switching signal SN[n 2] is high, the switch T4 of the driving circuit 120B is turned off. When the enable signal EM[n] is low, the switch T5 of the driving circuit 120B is turned on; when the enable signal EM[n] is high, the switch T5 of the driving circuit 120B is turned off. The electronic unit 150B can also be a light-emitting unit, a sensor, an antenna, or a radio frequency (RF) component.

In one embodiment of the present disclosure, when the electronic units 150A and 150B are light-emitting units, the circuit units 100A and 100B can be pixel circuit units for respectively driving the electronic units 150A and 150B to emit light.

In another embodiment, the electronic device 10A may further comprise circuit units 100C and 100D, and the four circuit units 100A, 100B, 100C, and 100D are arranged in proximity to each other. Among them, the circuit unit 100C comprises a time-interleaved circuit 110C, and the circuit unit 100D comprises a time-interleaved circuit 110D. The scan line 210A is coupled to the time-interleaved circuits 110A and 110C, and the scan line 210B is coupled to the time-interleaved circuits 110B and 110D. The circuit structure and coupling manner of the time-interleaved circuit 110C can be the same as that of the time-interleaved circuit 110A, and the circuit structure and coupling manner of the time-interleaved circuit 110D can be the same as that of the time-interleaved circuit 110B, which will not be described in detail herein.

Figure 3:
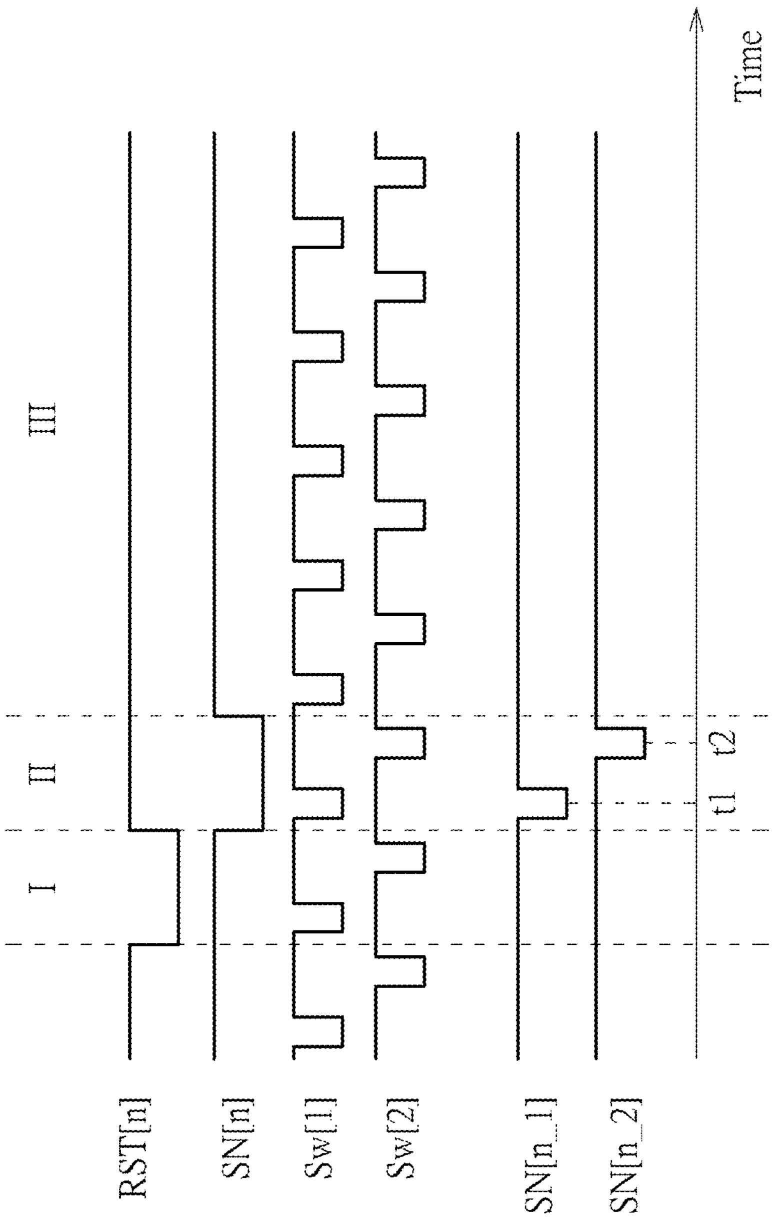
FIG. 3 is a signal timing diagram of the electronic device in FIG. 1.

Please refer to FIG. 1 to FIG. 3. FIG. 3 is a timing diagram of the electronic device 10A shown in FIG. 1. The clock signals Sw[1] and Sw[2] are not low at the same time. In phase I, the reset signal RST[n] is low, causing the switches T2 of both time-interleaved circuits 110A and 110B to be turned on, and thus resetting the potentials of both switching signals SN[n_1] and SN[n_2]. In phase II, the reset signal RST[n] is high and the scan signal SN[n] is low, causing the switches T1 of both time-interleaved circuits 110A and 110B to be turned on and the switches T2 of both time-interleaved circuits 110A and 110B to be turned off, resulting in the waveform of the switching signal SN[n_1] in phase II being the same as the waveform of the clock signal Sw[1] in phase II, and the waveform of the switching signal SN[n_2] in phase II being the same as the waveform of the clock signal Sw[2] in phase II. Since the two switching signals SN[n_1] and SN[n_2] are not low at the same time during phase II, the switch T4 of the driving circuit 120A and the switch T4 of the driving circuit 120B are turned on sequentially and not simultaneously, causing the data D1 and D2 on the data line 200 to be sampled sequentially at time points t1 and t2, respectively. As shown in FIG. 1, the data D1 sampled at time point t1 is transmitted to the circuit unit 100A, and the data D2 sampled at time point t2 is transmitted to the circuit unit 100B. Similarly, the circuit units 100C and 100D can sample the data on the data line 200 at time points t3 and t4, respectively, and obtain data D3 and D4, respectively. The data D3 sampled at time point t3 is transmitted to the circuit unit 100C, and the data D4 sampled at time point t4 is transmitted to the circuit unit 100D. The circuit unit 100C can drive the electronic unit 150C according to the data D3, and the circuit unit 100D can drive the electronic unit 150D according to the data D4. In phase III, both the reset signal RST[n] and the scan signal SN[n] are high, causing the switches T1 and T2 of both time-interleaved circuits 110A and 110B to be turned off.

The circuit structures of circuit units 100C and 100D can be identical to those of circuit units 100A and 100B in FIG. 2. The scan signals SN[n] received by the two circuit units 100C and 100D are not low at the same time as the scan signals SN[n] received by the two circuit units 100A and 100B. For example, the scan signals SN[n] received by the two circuit units 100C and 100D may not be low until a certain period in phase III after phase II in FIG. 3. In this way, the data on the data line 200 can be sampled by 100A, 100B, 100C, and 100D at the time points t1, t2, t3, and t4, respectively, resulting in data D1, D2, D3, and D4, respectively.

Figure 4:
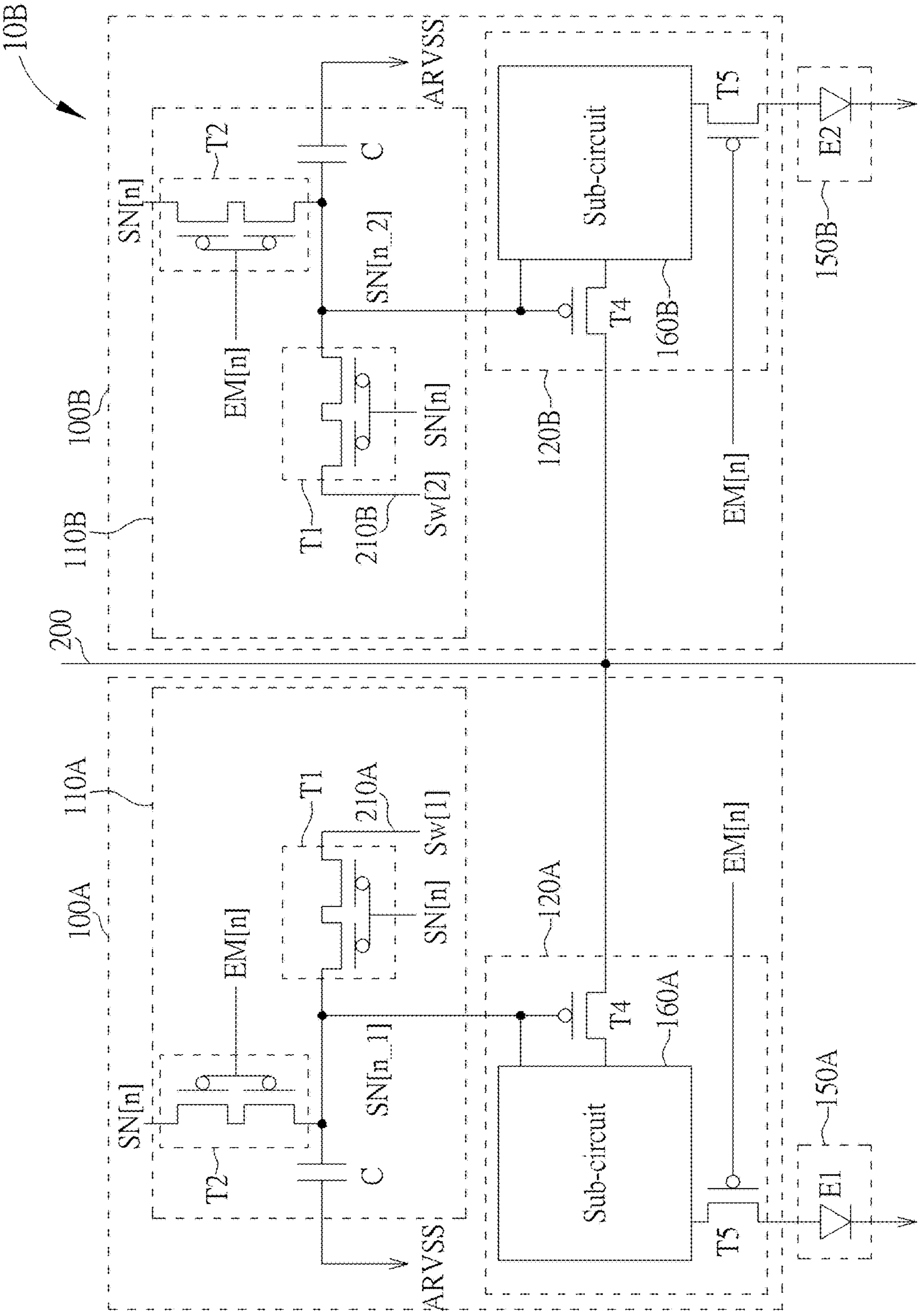
FIG. 4 is a partial circuit diagram of an electronic device according to another embodiment of the disclosure.
Figure 5:
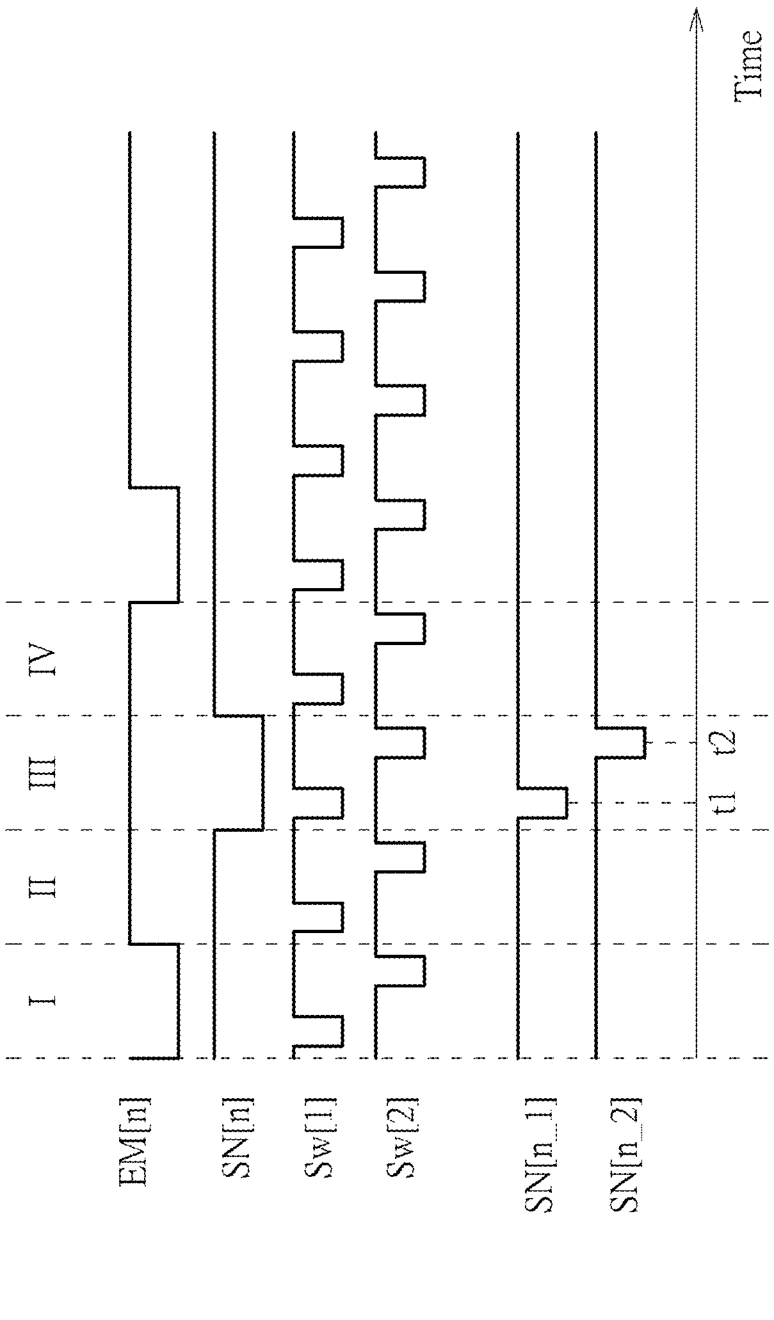
FIG. 5 is a signal timing diagram of the electronic device in FIG. 4.

Please refer to FIG. 4 to FIG. 5. FIG. 4 is a partial circuit diagram of the electronic device 10B according to another embodiment of the present disclosure, and FIG. 5 is a timing diagram of the electronic device 10B shown in FIG. 4. The circuit architecture of the electronic device 10B is the same as that of the electronic device 10A, but the difference between the two electronic devices 10A and 10B lies in that the control ends (i.e., the gates of the two transistors) of the switches T2 in the two circuit units 100A and 100B of the electronic device 10B receive the enable signal EM[n]. In phase I of FIG. 5, the enable signal EM[n] is low, causing the switches T2 of both time-interleaved circuits 110A and 110B to be turned on, and thus resetting the potentials of both switching signals SN[n_1] and SN[n_2]. In phase II of FIG. 5, both the enable signal EM[n] and the scan signal SN[n] are high, causing the switches T1 and T2 of both time-interleaved circuits 110A and 110B to be turned off. In phase III of FIG. 5, the enable signal EM[n] is high and the scan signal SN[n] is low, causing the switches T1 of both time-interleaved circuits 110A and 110B to be turned on and the switches T2 of both time-interleaved circuits 110A and 110B to be turned off, resulting in the waveform of the switching signal SN[n_1] in phase III being the same as the waveform of the clock signal Sw[1] in phase III, and the waveform of the switching signal SN[n_2] in phase III being the same as the waveform of the clock signal Sw[2] in phase III. Since the two switching signals SN[n_1] and SN[n_2] are not low at the same time during phase III, the switch T4 of the driving circuit 120A and the switch T4 of the driving circuit 120B are turned on sequentially and not simultaneously, causing the data D1 and D2 on the data line 200 to be sampled sequentially at time points t1 and t2, respectively.

In one embodiment, the electronic unit 150A may comprise a light-emitting element E1, and the electronic unit 150B may comprise a light-emitting element E2. The light-emitting elements E1 and E2 may be light-emitting diodes, respectively.

Figure 6:
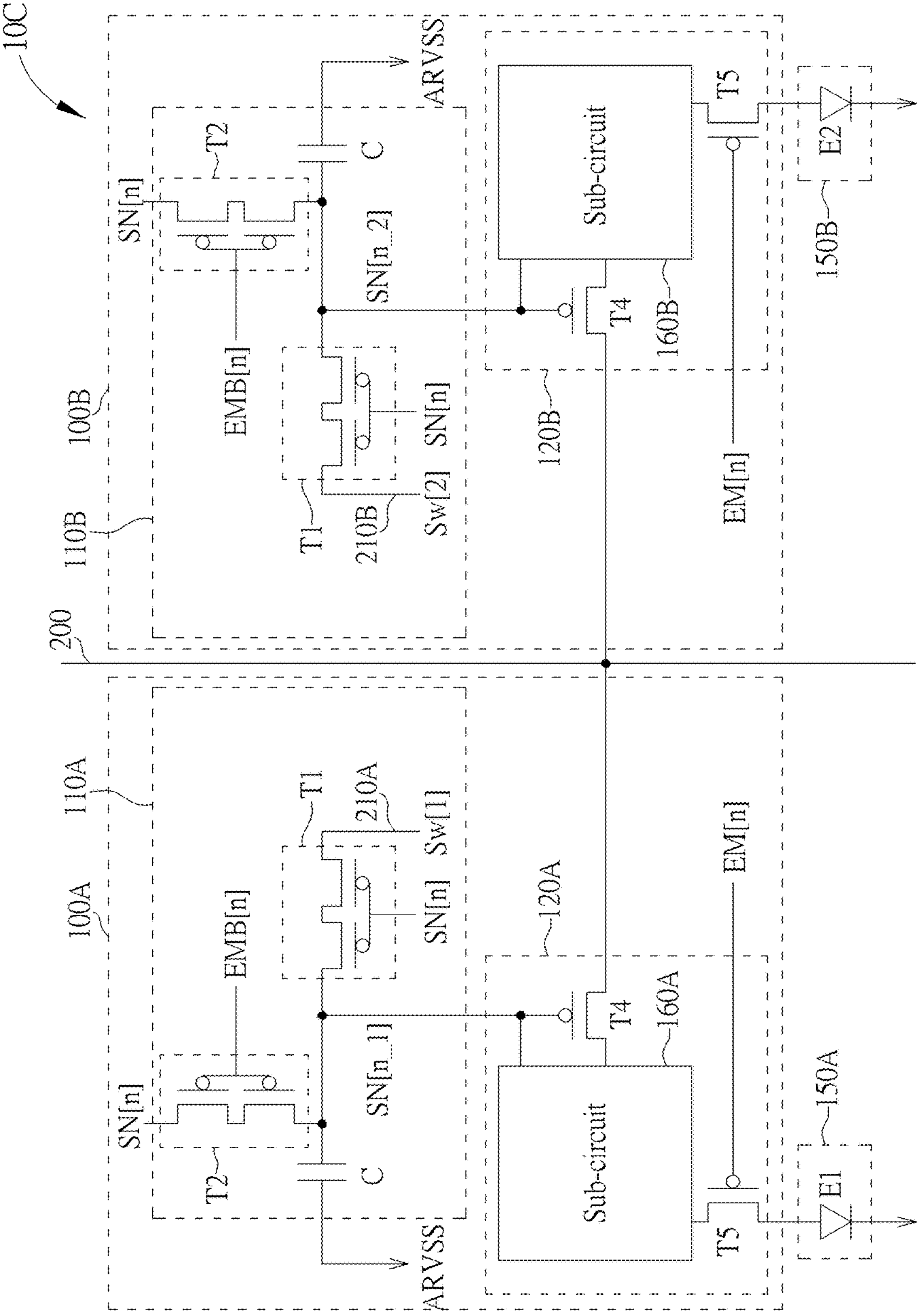
FIG. 6 is a partial circuit diagram of an electronic device according to another embodiment of the disclosure.
Figure 7:
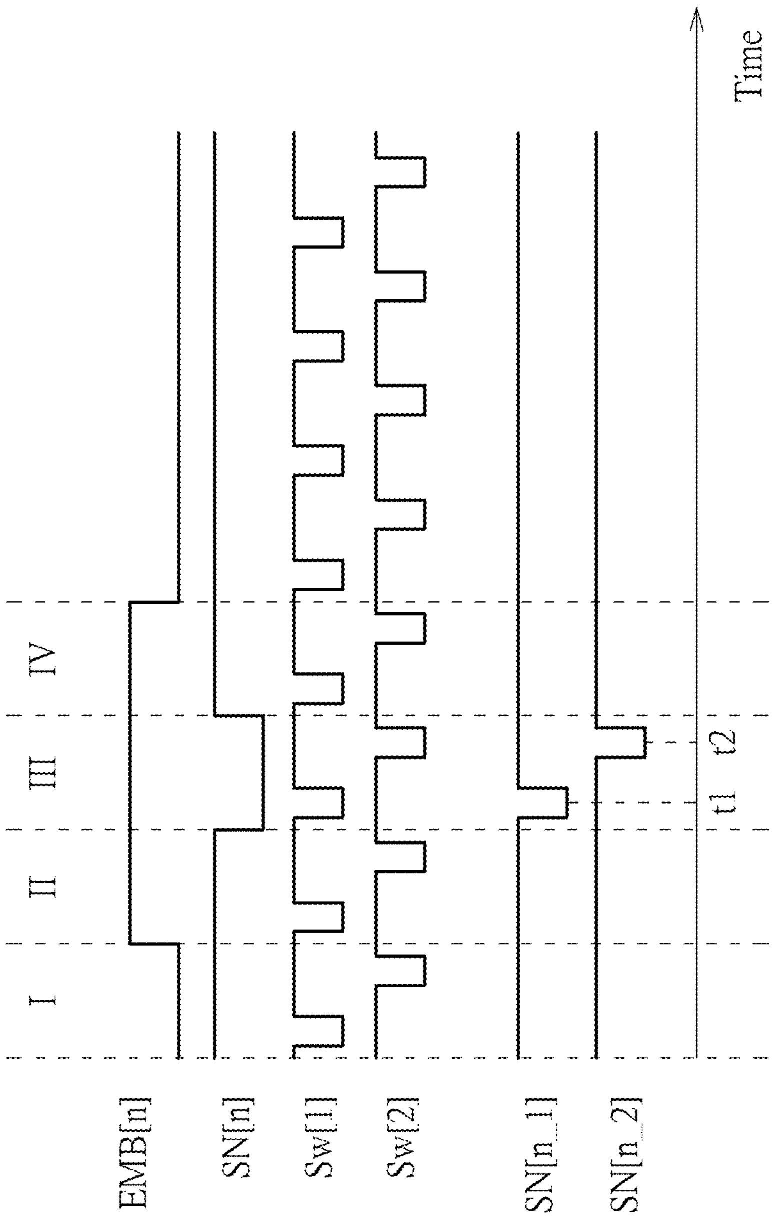
FIG. 7 is a signal timing diagram of the electronic device in FIG. 6.

Please refer to FIG. 6 to FIG. 7. FIG. 6 is a partial circuit diagram of the electronic device 10C according to another embodiment of the present disclosure, and FIG. 7 is a timing diagram of the electronic device 10C shown in FIG. 6. The circuit architecture of the electronic device 10C is the same as that of the electronic device 10A, but the difference between the two electronic devices 10C and 10A lies in that the control ends (i.e., the gates of the two transistors) of the switches T2 in the two circuit units 100A and 100B of the electronic device 10C receive a signal EMB[n], and the signal EMB[n] is not used to enable the switch T4, and the two switching signals SN[n_1] and SN[n_2] are only low when the signal EMB[n] is high. In phase I of FIG. 7, the signal EMB[n] is low, causing the switches T2 of both time-interleaved circuits 110A and 110B to be turned on, and thus resetting the potentials of both switching signals SN[n_1] and SN[n_2]. In phase II of FIG. 7, both the signal EMB[n] and the scan signal SN[n] are high, causing the switches T1 and T2 of both time-interleaved circuits 110A and 110B to be turned off. In phase III of FIG. 7, the signal EMB[n] is high and the scan signal SN[n] is low, causing the switches T1 of both time-interleaved circuits 110A and 110B to be turned on and the switches T2 of both time-interleaved circuits 110A and 110B to be turned off, resulting in the waveform of the switching signal SN[n_1] in phase III being the same as the waveform of the clock signal Sw[1] in phase III, and the waveform of the switching signal SN[n_2] in phase III being the same as the waveform of the clock signal Sw[2] in phase III. Since the two switching signals SN[n_1] and SN[n_2] are not low at the same time during phase III, the switch T4 of the driving circuit 120A and the switch T4 of the driving circuit 120B are turned on sequentially and not simultaneously, causing the data D1 and D2 on the data line 200 to be sampled sequentially at time points t1 and t2, respectively.

Figure 8:
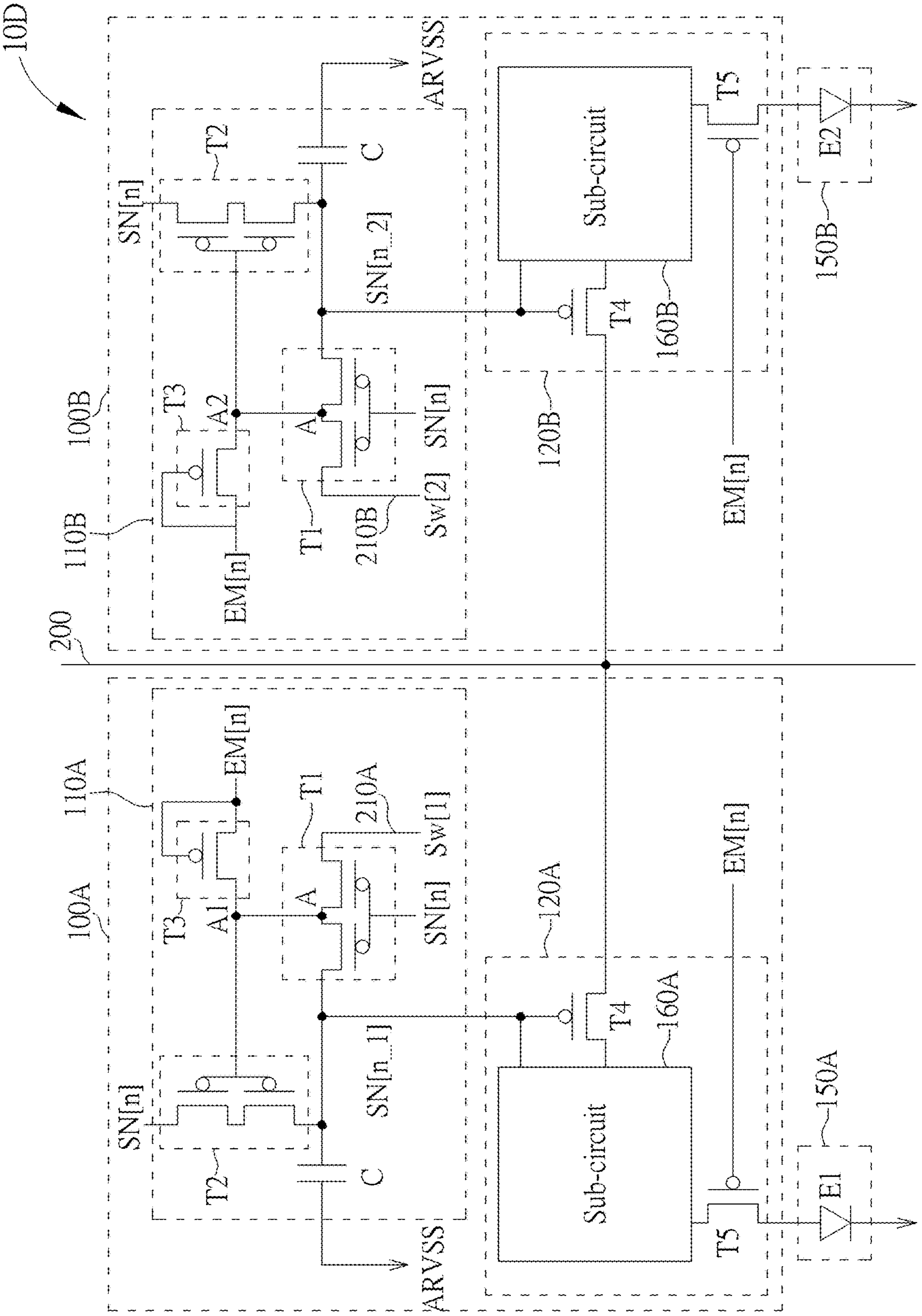
FIG. 8 is a partial circuit diagram of an electronic device according to another embodiment of the disclosure.

Please refer to FIG. 8. FIG. 8 is a partial circuit diagram of the electronic device 10D according to another embodiment of the present disclosure. The circuit architecture of the electronic device 10D is the same as that of the electronic device 10A, but the difference between the two electronic devices 10D and 10A lies in that, in addition to including all the components of the electronic device 10A, the two time-interleaved circuits 110A and 110B of the electronic device 10D each comprise a switch T3, and the junction A of the two transistors of the switch T1 in the time-interleaved circuit 110A and the control end (i.e., the gates of the two transistors) of the switch T2 are coupled to node A1, and the junction A of the two transistors of the switch T1 in the time-interleaved circuit 110B and the control end (i.e., the gates of the two transistors) of the switch T2 are coupled to node A2. The switches T3 of the two time-interleaved circuits 110A and 110B can be P-type transistors. Among them, the first end of the switch T3 in the time-interleaved circuit 110A is coupled to node A1, and the second end of the switch T3 in the time-interleaved circuit 110A is coupled to the control end (i.e., the gate) to receive the enable signal EM[n]. The first end of the switch T3 in the time-interleaved circuit 110B is coupled to node A2, and the second end of the switch T3 in the time-interleaved circuit 110B is coupled to the control end (i.e., the gate) to receive the enable signal EM[n]. The timing diagram of the signals of the electronic device 10D is as shown in FIG. 5. In phase I of FIG. 5, the enable signal EM[n] is low, causing the switches T3 of both time-interleaved circuits 110A and 110B to be turned on, causing the potential of node A1 to be low and causing the switches T2 of both time-interleaved circuits 110A and 110B to be turned on, thereby resetting the potentials of both switching signals SN[n_1] and SN[n_2]. In phase II of FIG. 5, both the enable signal EM[n] and the scan signal SN[n] are high, causing the switches T1 and T3 of both time-interleaved circuits 110A and 110B to be turned off. In phase III of FIG. 5, the enable signal EM[n] is high and the scan signal SN[n] is low, causing the switches T1 of both time-interleaved circuits 110A and 110B to be turned on, allowing the control end of the switch T2 in the time-interleaved circuit 110A and the switching signal SN[n_1] to have a waveform in phase III that is the same as the waveform of the clock signal Sw[1] in phase III; moreover, the control end of the switch T2 in the time-interleaved circuit 110B and the switching signal SN[n_2] can have a waveform in phase III that is the same as the waveform of the clock signal Sw[2] in phase III. Since the two switching signals SN[n_1] and SN[n_2] are not low at the same time during phase III, the switch T4 of the driving circuit 120A and the switch T4 of the driving circuit 120B are turned on sequentially and not simultaneously, causing the data D1 and D2 on the data line 200 to be sampled sequentially at time points t1 and t2, respectively.

The electronic device disclosed herein comprises two circuit units that can sample data from the same data line in a time-interleaved manner via time-interleaved circuits. In this way, the two circuit units can independently drive corresponding electronic units based on the data they have respectively sampled. Since the two circuit units share the same data line, the limited layout space of the electronic device can be effectively utilized.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a data line;
a first scan line;
a second scan line;
a first electronic unit;
a second electronic unit;
a first circuit unit configured to drive the first electronic unit and comprising a first time-interleaved circuit; and
a second circuit unit adjacent to the first circuit unit, configured to drive the second electronic unit and comprising a second time-interleaved circuit;
wherein the data line is coupled to the first circuit unit and the second circuit unit, the first scan line is coupled to the first time-interleaved circuit, and the second scan line is coupled to the second time-interleaved circuit; and
wherein the first time-interleaved circuit comprises a first switch and a second switch, the second time-interleaved circuit comprises a third switch and a fourth switch, a control end of the first switch and a control end of the third switch receive a same signal, a first end of the first switch is coupled to the first scan line to receive a first clock signal, and a first end of the third switch is coupled to the second scan line to receive a second clock signal.

2. The electronic device of claim 1, wherein at least one of the first time-interleaved circuit and the second time-interleaved circuit comprises a capacitor, a first end of the capacitor is coupled to at least two transistors, and a second end of the capacitor is coupled to a system voltage end.

3. The electronic device of claim 1, further comprising a third circuit unit and a fourth circuit unit, wherein the first circuit unit, the second circuit unit, the third circuit unit, and the fourth circuit unit are arranged in proximity, the third circuit unit comprises a third time-interleaved circuit, and the fourth circuit unit comprises a fourth time-interleaved circuit.

4. The electronic device of claim 3, wherein the first scan line is coupled to the first time-interleaved circuit and the third time-interleaved circuit, and the second scan line is coupled to the second time-interleaved circuit and the fourth time-interleaved circuit.

5. The electronic device of claim 3, wherein at least one of the first time-interleaved circuit, the second time-interleaved circuit, the third time-interleaved circuit, and the fourth time-interleaved circuit comprises a capacitor, a first end of the capacitor is coupled to at least two transistors, and a second end of the capacitor is coupled to a system voltage end.

6. The electronic device of claim 1, wherein the first circuit unit and the second circuit unit are pixel circuit units, and the first electronic unit and the second electronic unit are light-emitting units.

7. The electronic device of claim 1, wherein each of the first electronic unit and the second electronic unit comprises a light-emitting diode (LED).

8. The electronic device of claim 1, wherein the first clock signal and the second clock signal are not at a low voltage level simultaneously.

9. The electronic device of claim 1, wherein a control end of the second switch of the first time-interleaved circuit and a control end of the fourth switch of the second time-interleaved circuit receive a reset signal.

10. The electronic device of claim 1, wherein a control end of the second switch of the first time-interleaved circuit and a control end of the fourth switch of the second time-interleaved circuit receive an enable signal, and the enable signal is used to enable the first electronic unit and the second electronic unit.

11. The electronic device of claim 1, wherein the first electronic unit and the second electronic unit are antennas.

12. The electronic device of claim 1, wherein the first electronic unit and the second electronic unit are sensing elements.

13. The electronic device of claim 1, wherein the first circuit unit and the second circuit unit respectively sample a voltage level of the data line at different times through the first time-interleaved circuit and the second time-interleaved circuit.

14. The electronic device of claim 1, wherein each of the first time-interleaved circuit and the second time-interleaved circuit comprises a capacitor, a first end of the capacitor is coupled to at least two transistors, and a second end of the capacitor is coupled to a system voltage end.

15. The electronic device of claim 14, wherein the system voltage end provides a ground voltage.

16. The electronic device of claim 1, wherein the electronic device is a display device.

17. An electronic device, comprising:

a data line;

a first scan line;

a second scan line;

a first electronic unit;

a second electronic unit;

a first circuit unit configured to drive the first electronic unit and comprising a first time-interleaved circuit; and a second circuit unit adjacent to the first circuit unit, configured to drive the second electronic unit and comprising a second time-interleaved circuit;

wherein the data line is coupled to the first circuit unit and the second circuit unit, the first scan line is coupled to the first time-interleaved circuit, and the second scan line is coupled to the second time-interleaved circuit; and wherein the first time-interleaved circuit comprises a first switch, a second switch, and a third switch, the second time-interleaved circuit comprises a fourth switch, a fifth switch, and a sixth switch, a control end of the first switch and a control end of the fourth switch receive a same signal, a first end of the first switch is coupled to the first scan line to receive a first clock signal, and a first end of the fourth switch is coupled to the second scan line to receive a second clock signal.

18. The electronic device of claim 17, wherein the first clock signal and the second clock signal are not at a low voltage level simultaneously.

19. An electronic device, comprising:

a data line;

a first scan line;

a second scan line;

a first electronic unit;

a second electronic unit;

a first circuit unit configured to drive the first electronic unit and comprising a first time-interleaved circuit; and a second circuit unit adjacent to the first circuit unit, configured to drive the second electronic unit and comprising a second time-interleaved circuit;

wherein the data line is coupled to the first circuit unit and the second circuit unit, the first scan line is coupled to the first time-interleaved circuit, and the second scan line is coupled to the second time-interleaved circuit; and wherein a control end of a second switch of the first time-interleaved circuit and a control end of a fourth switch of the second time-interleaved circuit receive a signal, the first time-interleaved circuit outputs a first switch signal, the second time-interleaved circuit outputs a second switch signal, and the first switch signal and the second switch signal are at a low voltage level only when the signal is at a high voltage level.

* * * * *